US008836528B2

(12) United States Patent
Tezuka et al.

(10) Patent No.: US 8,836,528 B2
(45) Date of Patent: Sep. 16, 2014

(54) DATA DISPLAY DEVICE FOR MACHINE TOOL FOR DISPLAYING INFORMATION BASED ON SPECIFIED CONDITION

(71) Applicant: Fanuc Corporation, Yamanashi (JP)

(72) Inventors: Junichi Tezuka, Yamanashi (JP); Hajime Ogawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/945,551

(22) Filed: Jul. 18, 2013

(65) Prior Publication Data

US 2014/0022086 A1  Jan. 23, 2014

(30) Foreign Application Priority Data

Jul. 19, 2012  (JP) .................................. 2012-160625

(51) Int. Cl.
*G08B 21/00*  (2006.01)
(52) U.S. Cl.
USPC ........................................................ 340/680
(58) Field of Classification Search
USPC ................. 340/680, 648, 670, 672, 679, 683, 340/686.3, 691.6; 324/500; 702/182, 183
See application file for complete search history.

(56) References Cited

U.S. PATENT DOCUMENTS

| 6,338,024 | B1* | 1/2002 | Taniguchi et al. ............... 702/56 |
| 2005/0062599 | A1* | 3/2005 | Neubauer et al. ............. 340/506 |
| 2010/0017074 | A1* | 1/2010 | Verkuilen et al. ............... 701/50 |
| 2011/0063122 | A1* | 3/2011 | Matsubara et al. ........... 340/679 |
| 2012/0078574 | A1* | 3/2012 | Slates .......................... 702/179 |

FOREIGN PATENT DOCUMENTS

| JP | 2001-013997 A | 1/2001 |
| JP | 2002-200535 A | 7/2002 |
| JP | 2003-044120 A | 2/2003 |
| JP | 2003075472 A | 12/2003 |

\* cited by examiner

*Primary Examiner* — Phung Nguyen
(74) *Attorney, Agent, or Firm* — Lowe Hauptman & Ham, LLP (57) ABSTRACT

A data display device is adapted to associate data and parameters obtained from a numerical control apparatus with extracted information selected by an operator, and specify an arrangement condition or a selection condition based on the extracted information. The data display device is also adapted to display controlling information in an arranged manner according to the arrangement condition. Alternatively, the data display device is adapted to display only information in a selective manner which satisfies the condition specified according to the selection condition.

2 Claims, 5 Drawing Sheets

DATA DISPLAY DEVICE FOR MACHINE TOOL FOR DISPLAYING INFORMATION BASED ON SPECIFIED CONDITION

BACKGROUND OF THE INVENTION

1. Field of the Invention

The present invention relates to a data display device for a machine tool for displaying information based on a specified condition.

2. Description of the Related Art

A display apparatus for displaying data obtained from a numerical control apparatus which controls movement of a servo motor has been known. Such a display apparatus provides visual information relating to movement of the servo motor such as a position, a velocity and acceleration of the drive shaft or the like, which is useful for evaluation of the movement of the servo motor. JP-A-2003-75472 discloses a method and an apparatus for displaying on a screen control information obtained from a numerical control apparatus which controls a servo motor such that the information of waveform data overlaps with one another.

In some cases, a data set including parameters specified by the numerical control apparatus and data relating to movement of the servo motor corresponding to the parameters are stored so as to be associated with each other. Such a data set facilitates evaluation of the parameters, and assists in determining how parameters should be specified in order to control the servo motor as desired.

However, as the number of those data set increases, time required to search and select an appropriate data set for a desired control condition tends to become longer, making it difficult to perform parameter adjustments efficiently. Therefore, there is a need for a data display device for a machine tool adapted to more effectively display necessary information.

SUMMARY OF THE INVENTION

According to a first aspect, a data display device for displaying data relating to movement of a machine tool is provided, the data being obtained from a numerical control apparatus which controls movement of the machine tool. The device comprises: a data obtaining part for obtaining data relating to movement of the machine tool from the numerical control apparatus; a parameter obtaining part for obtaining parameters from the numerical control apparatus, the parameters relating to a control condition for controlling the machine tool; a data storing part for storing the data and the parameters so as to associate the data and the parameters with each other; an information extraction specifying part for specifying at least one kind of information to be extracted from the data; an information extracting part for extracting from the data the at least one kind of information to be extracted which is specified by the information extraction specifying part; an extracted information applying part for applying the at least one kind of information extracted by the information extracting part to the data and the parameters associated with each other, so as to further associate the at least one kind of extracted information with the data and the parameters; a condition specifying part for specifying, based on the at least one kind of extracted information associated with the data and the parameters by the extracted information applying part, either an arrangement condition in which at least one of the data and the parameters associated with each other are arranged, or a selection condition in which at least one of desired data and parameters are selected from at least one of the data and the parameters associated with each other; and a display part for either displaying at least one of the data and the parameters associated with each other in an arranged manner based on the arrangement condition, or displaying at least one of the desired data and parameters from the data and the parameters associated with each other in a selective manner based on the selection condition.

According to a second aspect, the data display device according to the first aspect further comprises an extracted information modifying part for producing modified extracted information obtained by weighting the at least one kind of extracted information associated with the data and the parameters by the extracted information applying part, wherein the condition specifying part is adapted to specify, based on the modified extracted information, either an arrangement condition in which at least one of the data and the parameters associated with each other are arranged, or a selection condition in which at least one of desired data and parameters are selected from at least one of the data and the parameters associated with each other.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described with reference to the accompanying drawings. Illustrated constituent elements of the embodiments may be modified in size for better understanding.

Figure 1:
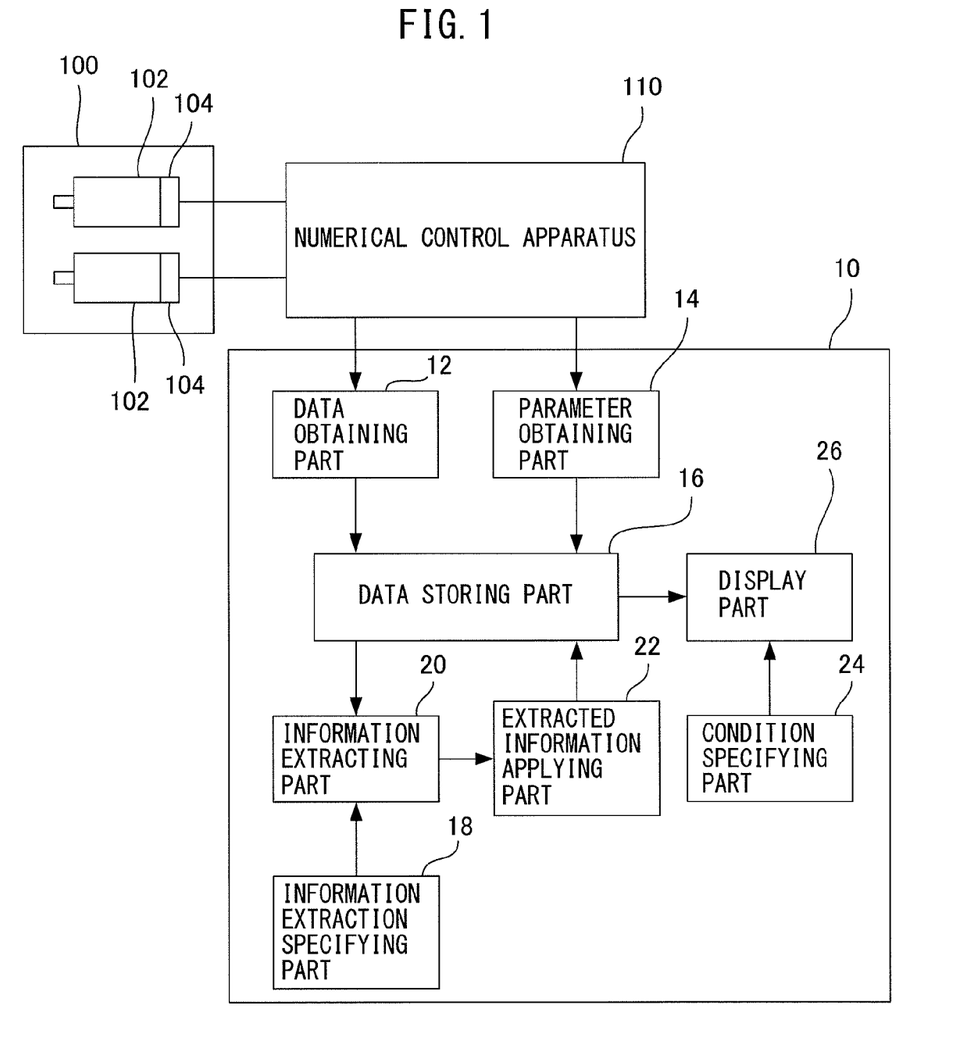
FIG. 1 is a block diagram to explain a data display device according to a first embodiment.

FIG. 1 is a block diagram to explain a data display device 10 according to a first embodiment. The data display device 10 is adapted to store information obtained from a numerical control apparatus 110 which controls movement of a machine tool 100 and display stored information as necessary. Information displayed by the data display device 10 is specified by an operator with a known input apparatus such as a mouse or keyboard. The information displayed by the data display device 10 is displayed on a monitor (not shown), so that an operator can visually check the information.

The numerical control apparatus 110 drives servo motors 102 according to a predetermined machining program and parameters for determining various machining conditions. Each servo motor 102 can be controlled independently of one another so as to actuate a corresponding shaft of the machine tool 100. By appropriately controlling the servo motors 102, a tool attached to the machine tool 100 is moved to a desired position in a desired posture relative to a workpiece. Each servo motor 102 is provided with a position detector 104 such as an encoder. The position detector 104 detects a position of the corresponding servo motor 102 and outputs a position feedback signal to the numerical control apparatus 110. The numerical control apparatus 110 drives the servo motors 102 in accordance with a difference (an amount of position deviations) between a command position specified by the machining program and an actual position fed back from the position detector 104. In relation to the present invention, the machine tool 100 and the numerical control apparatus 110 are not limited to any specific configurations or functions. Since the configurations of the machine tool 100 and the numerical control apparatus 110 are widely known in the art, the detailed explanation thereon will be omitted herein. Although two servo motors 102 are illustrated in FIG. 1, any number of servo motors 102 may be employed, depending on the specification of the machine tool 100.

As shown in FIG. 1, the data display device 10 includes a data obtaining part 12, a parameter obtaining part 14, a data storing part 16, an information extraction specifying part 18, an information extracting part 20, an extracted information applying part 22, a condition specifying part 24, and a display part 26. The data display device 10 has a hardware configuration which is not limited to any type, but includes constituent elements for performing general processing and calculation, such as CPU, RAM and ROM. The data display device 10 is configured in a combination of known constituent elements, so as to perform functions, which will be described below for more details.

The data obtaining part 12 of the data display device 10 obtains data which pertain to movement of the machine tool 100 from the numerical control apparatus 110. The data include, but are not limited to, a position, a velocity and acceleration of the servo motor 102 incorporated in the machine tool 100. The position of the servo motor 102 is detected by the position detector 104, as described above. The velocity and acceleration of the servo motor 102 is each calculated based on the positional information obtained from the position detector 104 and a sampling cycle of detection. The data obtained by the data obtaining part 12 are output to the data storing part 16, which will be described below.

The parameter obtaining part 14 of the data display device 10 obtains parameters which pertain to controlling conditions for an operation of the machine tool 100 from the numerical control apparatus 110. The parameters are set in the numerical control apparatus 110 in order to specify a controlling type or an operational condition such as acceleration/deceleration of the servo motor 102 or the like. The parameters obtained by the parameter obtaining part 14 are output to the data storing part 16, which will be described below.

Figure 2:
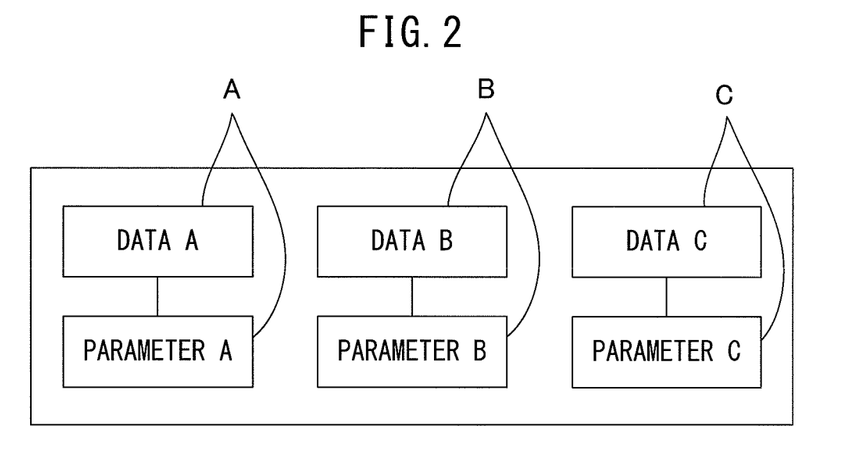
FIG. 2 conceptually shows a data set and a parameter set stored in a data storing part of the data display device shown in FIG. 1.

The data storing part 16 of the data display device 10 stores the data from the data obtaining part 12 and the parameters from the parameters obtaining part 14, so as to associate them with each other. For example, if data are recorded as Data A for certain movement of the servo motor 102 when Parameter A is set in the numerical control apparatus 110, Data set A in which Parameter A and Data A is associated with each other is created. FIG. 2 conceptually shows a data set and a parameter set stored in the data storing part 16. FIG. 2 shows an example in which three data sets, i.e., Data set A, Data set B and Data set C, are included. As illustrated, Data A, Data B and Data C are associated with Parameter A, Parameter B and Parameter C, respectively, so as to create Data set A, Data set B and Data set C, respectively. In this way, the parameters and data are stored such that they are associated with each other, and therefore, parameters corresponding to certain data can be readily found later.

The information extraction specifying part 18 specifies information which should be extracted from the data stored in the data storing part 16. The extracted information includes, but is not limited to trajectory errors, smoothness of feeding motion of the tool (the maximum position deviation when the tool is moved at a low speed), circularity (the maximum error in a circular arc mode), a particular frequency component of torque commands which is used for, e.g., cogging correction, the maximum value and RMS (root means square) of torque commands, power consumption, a cycle time, and a ratio between accelerating time and decelerating time. The information to be extracted is preferably one of those useful to evaluate the movement of the machine tool, but may also be used for other purposes. The information to be extracted may be selected by an operator with a known input means, such as a mouse or keyboard. Alternatively, the information extraction specifying part 18 may also be configured to automatically specify predetermined information for extraction. The information specified by the information extraction specifying part 18 for extraction may be one kind or two kinds or more, depending on the application.

The information extracting part 20 of the data display device 10 extracts the information specified by the information extraction specifying part 18 from the data stored in the data storing part 16. For example, the extracted information may be calculated by processing data obtained from the numerical control apparatus 110 in a known way, as described above in relation to the several specific examples. The information extracted by the information extracting part 20 is output to the extracted information applying part 22.

Figure 3:
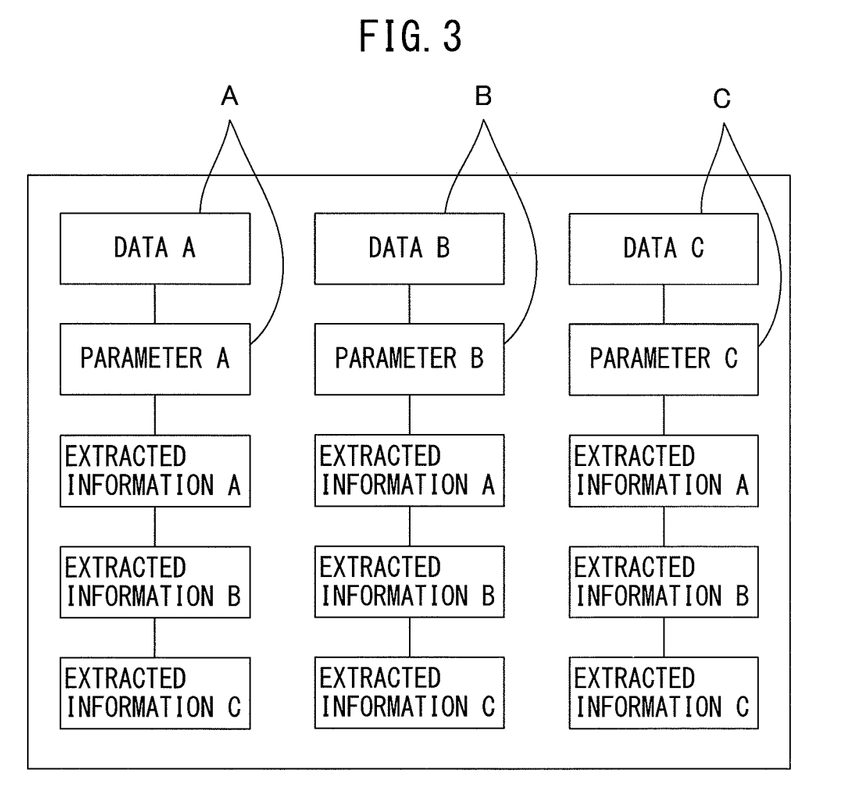
FIG. 3 conceptually shows a data set and a parameter set with which extracted information is further associated.

The extracted information applying part 22 of the data display device 10 applies the information extracted by the information extracting part 20 to the data and the parameters, which are associated with each other as described above. This allows the extracted information to be further associated with the data and the parameters. FIG. 3 conceptually shows a data set and a parameter set with which the extracted information is further associated. FIG. 3 shows an example in which three kinds of extracted information, i.e., Extracted information A, Extracted information B and Extracted information C is in association with the data and parameters, respectively. As illustrated, Data set A, Data set B and Data set C are associated with Extracted information A, Extracted information B and the Extracted information C, respectively. The data set with which the extracted information is further associated is stored in the data storing part 16 or an additional storing part (not shown) separately provided.

The condition specifying part 24 of the data display device 10 specifies a condition, based on which it is determined what kind of information is displayed by the displaying part 26, which will be described below. More specifically, based on the extracted information associated by the extracted information applying part 22, either an arrangement condition or a selection condition is specified upon selection by an operator. The arrangement condition applies to the case where at least one of the data and the parameters should be displayed in a certain arrangement. For example, the arrangement condition may be specified so that the parameters are displayed such that the maximum values of the torque commands are arranged in a descending order.

On the other hand, the selection condition applies to the case where desired information should be selected from at least one of the data and the parameters associated with each other. For example, the selection condition may be specified in order to selectively display only parameters when the power consumption of the servo motor 102 falls within a certain range in relation to a reference value. The arrangement condition and the selection condition can be specified by an operator with a known input apparatus, such as a mouse or keyboard.

The display part 26 of the data display device 10 displays either data or parameters or both, based on the arrangement condition or the selection condition specified by the condition specifying part 24. The display part 26 displays at least one data or parameters in a way that an operator can visually recognize through a display apparatus such as a monitor, which is not shown in the drawings. Apart from the data or the parameters according to the arrangement condition or the selection condition, the display part 26 may also display other required information, depending on the application.

Figure 4:
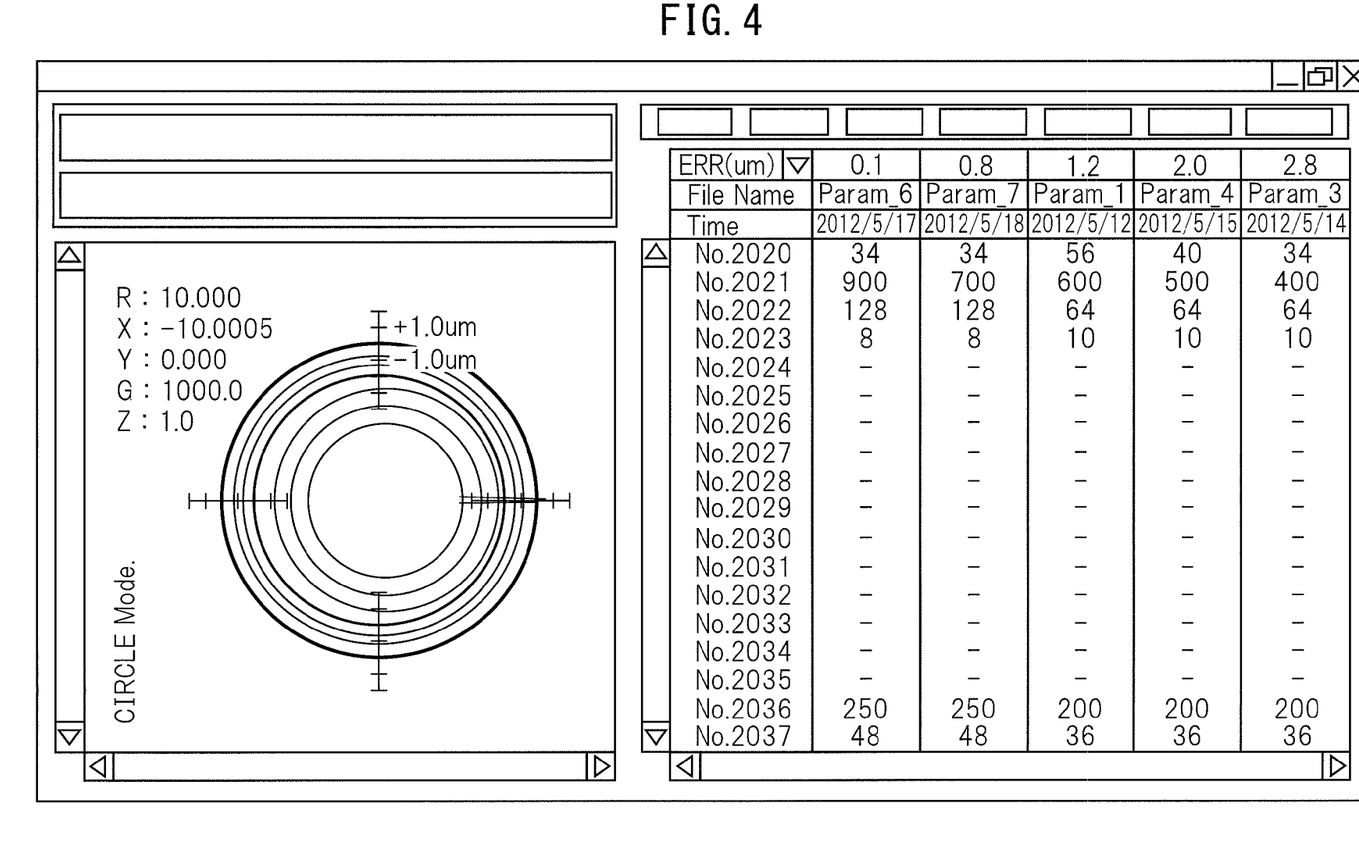
FIG. 4 shows exemplary information displayed on a display apparatus.

FIG. 4 shows exemplary information displayed on the display apparatus by the display part 26. FIG. 4 shows the case where the parameters are displayed such that corresponding trajectory errors ERR, i.e., differences between a command trajectory and an actual trajectory of a tool tip point are arranged in an ascending order from the left. Thus, FIG. 4 shows an exemplary display according to the arrangement condition under which the parameters are displayed in a way that the trajectory errors are arranged in an ascending order. In the illustrated example, trajectory data are shown, to the left of the drawing. The trajectory data represent a trajectory deviation when the tool tip point is controlled with circular movement by the servo controller. The trajectory deviation is numerically converted to the trajectory error ERR for evaluation of the parameters.

The trajectory error ERR is obtained by calculating a distance between a command trajectory and an actual trajectory along a straight line extending in a direction perpendicular to a tangential line through a given point on one of the trajectories, e.g., the command trajectory. Each parameter is shown as Param 1, Param 2, . . . , etc. In the illustrated example, Param 6, Param 7, Param 1, Param 4 and Param 3 are displayed from the left, respectively, in accordance with an ascending order of the trajectory error ERR. Since the parameters (or data or both) are displayed based on the specified arrangement condition in this way, it requires less time to search desired information among a very large number of data sets. Accordingly, it allows an operator to easily and quickly evaluate the parameters, etc.

The same also applies to the case where the display part 26 performs a displaying process based on the selection condition, instead of the arrangement condition. For example, in the example shown in FIG. 4, when the selection condition is specified so as to display the trajectory error ERR is equal to, or less than 1.0 micrometer, only the parameters of Param 6 and Param 7 are displayed (not illustrated). Accordingly, only the parameters (or data or both) which satisfy the specified condition are displayed on the display apparatus. Such information on the display apparatus allows an operator to select appropriate parameters. In this case, only the parameters which satisfy the specified condition are displayed on the display apparatus, as described above, and therefore, a step for searching information among the displayed information can be omitted. Accordingly, an operator can easily and quickly evaluate the parameters, etc.

Figure 5:
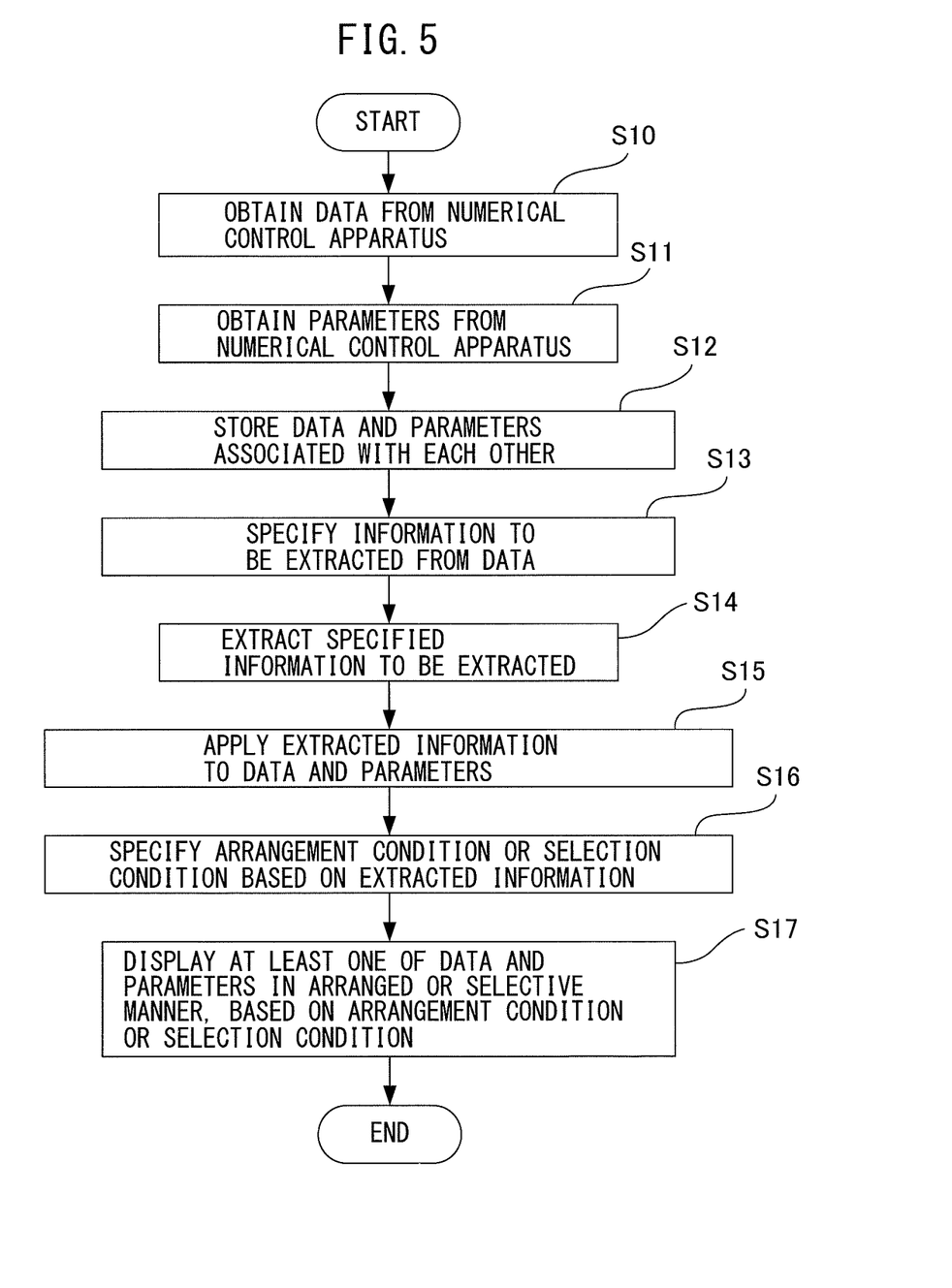
FIG. 5 is a flowchart showing a process for displaying in the data display device according to the first embodiment.

Referring to FIG. 5, a display process of the data display device 10 will now be described. FIG. 5 is a flowchart showing a process for displaying in the data display device 10. First, the data obtaining part 12 obtains data from the numerical control apparatus 110 (step S10). The data include a position, a velocity and acceleration of the servo motor 102 or the like, for example. The parameter obtaining part 14 obtains parameters from the numerical control apparatus 110 (step S11). The parameters are set in the numerical control apparatus 110 in order to specify a controlling type or an operational condition such as acceleration/deceleration of the servo motor 102 or the like, as described above. The data and the parameters obtained at steps S10 and S11 are stored in the data storing part 16 such that the data and the parameters are associated with each other (step S12). Reference should also be made to the description in relation to FIGS. 1 and 2.

The information extraction specifying part 18 then specifies information for extraction (step S13). As described above, information to be extracted may include trajectory errors, smoothness of feeding motion of the tool (the maximum position deviation when the tool is moved at a low speed), circularity (the maximum error in a circular arc mode), a particular frequency component of torque commands, which is used for, e.g., cogging correction, the maximum value and RMS (root means square) of torque commands, power consumption, a cycle time, and a ratio between accelerating time and decelerating time. For example, the specification of the information for extraction is performed by an operator with a known input apparatus.

At step S14, the information extracting part 20 extracts the information specified at step S13. The extracted information may be calculated in a known way based on the data obtained from the numerical control apparatus 110 at step S10. The extracted information applying part 22 then applies the information extracted at step S14 to the data and the parameters which have been stored such that they are associated with each other, as described in relation to step S12 (step S15). The above description in relation to FIGS. 1 and 3 should also be referred to. Table 1 shows an example in which Extracted information A, Extracted information B and Extracted information C are associated with the data and the parameters.

TABLE 1

| Extracted information A | Extracted information B | Extracted information C | Data | Parameters |
|---|---|---|---|---|
| 0 | 11 | 30 | Data A | Param A |
| 2 | 9 | 24 | Data B | Param B |
| 5 | 4 | 15 | Data C | Param C |
| 3 | 6 | 33 | Data D | Param D |
| 4 | 7 | 18 | Data E | Param E |

At step S16, the condition specifying part 24 specifies an arrangement condition or a selection condition based on the extracted information applied to the data and the parameters at step S15. Then, the display part 26 displays one or both of the data and the parameters specified at step S16 in an arranged manner or in a selective manner (step S17).

Table 2 shows an exemplary arrangement condition specified at step S16 according to Example 1. In this case, only Extracted information A is used as an indicator of the arrangement condition. An "ascending" order is specified as an arrangement order, so as to arrange the results from the smaller value to the greater value. Only the data are specified as displayed information. Accordingly, the information to be displayed by the display part 26 is the data only.

TABLE 2

| | Extracted information | | |
|---|---|---|---|
| | A | B | C |
| Indicator selection | YES | NO | NO |
| Arrangement | Ascending | N/A | N/A |

TABLE 2-continued

|  | Extracted information | | |
|---|---|---|---|
|  | A | B | C |
| Reference value | N/A | N/A | N/A |
| Displayed information | Data | N/A | N/A |

Table 3 shows the displayed information according to Example 1. Referring to Table 3, the data are arranged and displayed from the smaller value of Extracted information A.

TABLE 3

| Extracted information A | Data |
|---|---|
| 0 | Data A |
| 2 | Data B |
| 3 | Data D |
| 4 | Data E |
| 5 | Data C |

Table 4 shows another example of the arrangement condition specified at step S16 according to Example 2. In this case, only Extracted information B is used as an indicator of the arrangement condition. A "descending" order is specified as an arrangement order, so as to arrange the results from the greater value to the smaller value. Reference value of "9" is also specified. Under the specified condition with the reference value of "9" in the "descending" order, values greater than the reference value are excluded from the displayed information. Only the parameters are specified as the displayed information. Accordingly, the information to be displayed by the display part 26 in this case is the parameters only.

TABLE 4

|  | Extracted information | | |
|---|---|---|---|
|  | A | B | C |
| Indicator selection | NO | YES | NO |
| Arrangement | N/A | Descending | N/A |
| Reference value | N/A | 9 | N/A |
| Displayed information | N/A | Parameters | N/A |

Table 5 shows the displayed information according to Example 2. Referring to Table 5, the parameters are arranged and displayed from the greater value of Extracted information B, and Param A which is greater than the reference value is not displayed.

TABLE 5

| Extracted information B | Parameters |
|---|---|
| 9 | Param B |
| 7 | Param E |
| 6 | Param D |
| 4 | Param C |

Table 6 shows yet another example of the arrangement condition specified at step S16 according to Example 3. In this case, only Extracted information C is used as an indicator of the arrangement condition. An "ascending" order is specified as an arrangement order, so as to arrange the results from the smaller value to the greater value. Reference value of "18" is also specified. Under the specified condition with the reference value of "18" in the "ascending" order, values smaller than the reference value are excluded from the displayed information. The parameters and the data are specified as the displayed information. Accordingly, the information to be displayed by the display part 26 in this case is the parameters and the data.

TABLE 6

|  | Extracted information | | |
|---|---|---|---|
|  | A | B | C |
| Indicator selection | NO | NO | YES |
| Arrangement | N/A | N/A | Ascending |
| Reference value | N/A | N/A | 18 |
| Displayed information | N/A | N/A | Parameters Data |

Table 7 shows the displayed information according to Example 3. Referring to Table 7, the parameters are arranged and displayed from the smaller value of Extracted information C, and Param C which is smaller than the reference value is not displayed.

TABLE 7

| Extracted information C | Data | Parameters |
|---|---|---|
| 18 | Data E | Param E |
| 24 | Data B | Param B |
| 30 | Data A | Param A |
| 33 | Data D | Param D |

Table 8 shows an example of the selection condition specified at step S16 according to Example 4. In this case, each of Extracted information A, B and C is used as an indicator of the selection condition. Reference values based on which selection is made are specified for the respective extracted information. A selection range is also specified to determine a range in which extracted information different from the reference value should be selected. The parameters and the data are specified as the displayed information. Accordingly, the information to be displayed by the display part 26 in this case is the parameters and the data.

TABLE 8

|  | Extracted information | | |
|---|---|---|---|
|  | A | B | C |
| Indicator selection | YES | YES | YES |
| Reference value | 5 | 6 | 30 |
| Selection range | ±2 | ±2 | ±5 |
| Displayed information | Parameters Data | Parameters Data | Parameters Data |

Table 9 shows the extracted information, the data and the parameters associated with one another in a similar manner as Table 1. Unlike Table 1, however, some of the values in the table are underlined. For better understanding of the present invention, only the values of the extracted information which fall within the range of the selection specified under the selection condition shown in Table 8 are underlined.

TABLE 9

| Extracted information A | Extracted information B | Extracted information C | Data | Parameters |
|---|---|---|---|---|
| 0 | 11 | <u>30</u> | Data A | Param A |
| 2 | 9 | 24 | Data B | Param B |
| <u>5</u> | <u>4</u> | 15 | Data C | Param C |
| <u>3</u> | <u>6</u> | <u>33</u> | Data D | Param D |
| <u>4</u> | <u>7</u> | 18 | Data E | Param E |

As can be seen in Table 9, a data set of Data D and Param D satisfies the condition in which each of Extracted information A, Extracted information B and Extracted information C falls within the range of the selection. Accordingly, the information displayed by the display part 26 is as shown in Table 10:

TABLE 10

| Data | Parameters |
|---|---|
| Data D | Param D |

The embodiments in which necessary information is displayed according to the arrangement conditions (Examples 1 to 3) and the selection conditions (Example 4) have been described above. According to the embodiments, upon selection by an operator, necessary information among a large number of data sets is displayed in an arranged manner, or selectively displayed only when it satisfies the specified condition. This allows the operator to search parameters of the numerical control apparatus 110 or the like among a large number of data sets for a shorter period of time. Therefore, workload of the operator for evaluating the data and the parameters can be significantly reduced.

Next, embodiments different from the above will be described. In the following, the matters which have already been described will be omitted as necessary. Like elements are designated with the same referential numerals.

Figure 6:
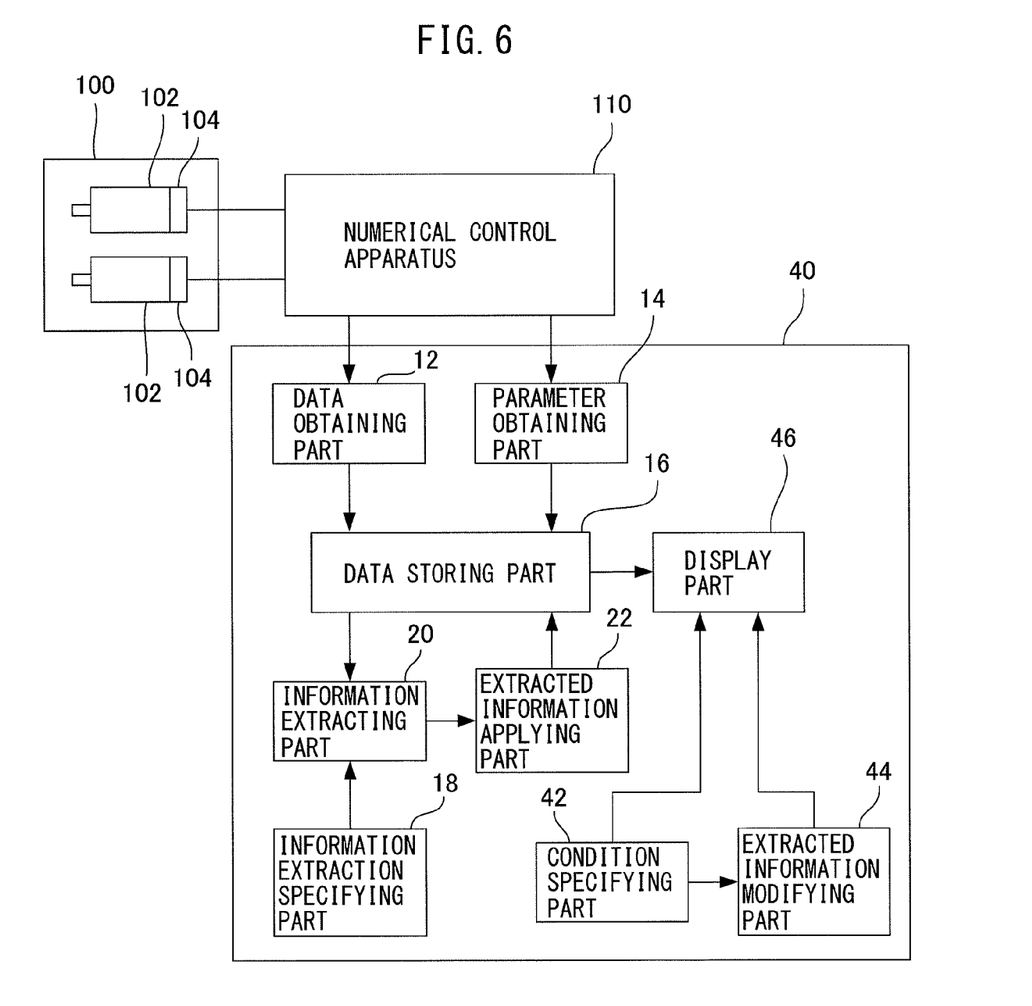
FIG. 6 is a block diagram to explain a data display device according to a second embodiment.

FIG. 6 is a block diagram to explain a data display device 40 according to a second embodiment. FIG. 6 differs from FIG. 1 according to the first embodiment in that the data display device 40 further includes an extracted information modifying part 44. The interrelationships between the data display device 40, the machine tool 100 and the numerical control apparatus 110 are the same as the first embodiment, and therefore, a detailed explanation thereon will be omitted. In addition, some of the constituent elements of the data display device 40, such as the data obtaining part 12, the parameter obtaining part 14, the data storing part 16, the information extraction specifying part 18, the information extracting part 20 and the extracted information applying part 22 are the same as those of the data display device 10 in the first embodiment, and therefore, a detailed explanation thereon will be omitted.

The extracted information modifying part 44 of the data display device 40 generates modified extracted information by weighing the extracted information applied to the data and the parameters. According to the present embodiment, the respective extracted information is weighed and numerically converted, based on importance of each different kind of extracted information relative to one another. The numerically-converted modified extracted information can be used as a common indicator for different kinds of extracted information. The condition specifying part 42 of the data display device 40 specifies an arrangement condition or a selection condition, based on the modified extracted information which has been weighted.

Table 11 shows a relationship between the respective extracted information, the data and the parameters. Although the contents of Table 11 are the same as those of Table 1, Table 11 is shown again for convenience of explanation.

TABLE 11

| Extracted information A | Extracted information B | Extracted information C | Data | Parameters |
|---|---|---|---|---|
| 0 | 11 | 30 | Data A | Param A |
| 2 | 9 | 24 | Data B | Param B |
| 5 | 4 | 15 | Data C | Param C |
| 3 | 6 | 33 | Data D | Param D |
| 4 | 7 | 18 | Data E | Param E |

Table 12 shows an example of the arrangement condition specified by the condition specifying part 42 according to Example 5. In this case, each of Extracted information A, Extracted information B and Extracted information C is used as an indicator of the arrangement condition. As an arrangement order, an "ascending" order is specified for Extracted information A and Extracted information C, and a "descending" order is specified for Extracted information B. The parameters and the data are specified as the displayed information. Accordingly, the information to be displayed by the display part 46 is the parameters and the data. Further, according to the present embodiment, weighing factors of 2, 5, and 3 are specified for Extracted information A, Extracted information B and Extracted information C, respectively.

TABLE 12

| | Extracted information | | |
|---|---|---|---|
| | A | B | C |
| Indicator selection | YES | YES | YES |
| Weighing factor | 2 | 5 | 3 |
| Arrangement | Ascending | Descending | Ascending |
| Reference value | N/A | N/A | N/A |
| Displayed information | Parameters Data | Parameters Data | Parameters Data |

Weighing calculation can be performed, for example, by multiplying the corresponding weighing factors with the respective extracted information and normalizing it by dividing with the maximum value of the respective extracted information. In Example 5 in which Extracted information A and C is arranged in an ascending order and Extracted information B is arranged in a descending order, the respective extracted information can be numerically converted in accordance with the following formula:

$$P = \frac{1}{(a+b+c)}\left[a\left(1 - \frac{A}{A_{max}}\right) + b\frac{B}{B_{max}}c\left(1 - \frac{C}{C_{max}}\right)\right]$$

where P is a point obtained as a result of the numerical conversion, a, b and c are weighing factors for Extracted information A, B and C, respectively, and $A_{max}$, $B_{max}$ and $C_{max}$ are the maximum values of Extracted information A, B and C, respectively.

Table 13 shows exemplary displayed information by the display part 46. As can be seen in Table 13, the parameters and the data are displayed in a descending order, based on the points for the respective data sets calculated according to the above formula.

TABLE 13

| Points | Data | Parameters |
|--------|------|------------|
| 0.73 | Data A | Param A |
| 0.61 | Data B | Param B |
| 0.49 | Data E | Param E |
| 0.353 | Data D | Param D |
| 0.345 | Data C | Param C |

As described above, the display part 46 of the data display device 40 according to the present embodiment displays at least one of the data and the parameters according to the points which are the modified extracted information obtained by weighing the extracted information. The present embodiment is particularly advantageous in the case where multiple kinds of extracted information are used to specify the condition in the condition specifying part 42, as described above. Since weighing is performed based on importance of the respective extracted information, the specified condition can be finely defined as necessary. With the specified condition appropriately defined, it is ensured that desired information can be displayed.

In relation to the second embodiment, although the case where the arrangement condition is specified has been described by way of example, the selection condition may also be specified in a similar way as the first embodiment.

Although the various embodiments have been described, it is apparent to a person skilled in the art that the present invention can also be implemented in any combination of the features explicitly or implicitly disclosed herein.

EFFECT OF THE INVENTION

According to the first aspect, the arrangement condition or the selection condition is determined based on the information extracted from the data. The data or the parameters are displayed such that they are arranged according to the arrangement condition, or that only the data or the parameters which satisfy the selection condition are selectively displayed. Therefore, it requires less time for an operator to search necessary information and facilitates evaluation of the data or the parameters by the operator under a particular condition.

According to the second aspect, the arrangement condition or the selection condition is determined based on modified extracted information obtained by weighing the extracted information. Accordingly, for example, if multiple kinds of information are specified, the arrangement condition or the selection condition is precisely adjusted in accordance with importance of the respective extracted information. Therefore, it is ensured that appropriate data or parameters are displayed.

Although the invention has been shown and described with exemplary embodiments thereof, it should be understood by those skilled in the art that the foregoing and various other changes, omissions and additions may be made therein and thereto without departing from the spirit and scope of the invention.

The invention claimed is:

1. A data display device for displaying data relating to movement of a machine tool, the data being obtained from a numerical control apparatus which controls movement of the machine tool, the device comprising:
    a data obtaining part for obtaining data relating to movement of the machine tool from the numerical control apparatus;
    a parameter obtaining part for obtaining parameters from the numerical control apparatus, the parameters relating to a control condition for controlling the machine tool;
    a data storing part for storing the data and the parameters so as to associate the data and the parameters with each other;
    an information extraction specifying part for specifying at least one kind of information to be extracted from the data;
    an information extracting part for extracting from the data the at least one kind of information to be extracted which is specified by the information extraction specifying part;
    an extracted information applying part for applying the at least one kind of information extracted by the information extracting part to the data and the parameters associated with each other, so as to further associate the at least one kind of extracted information with the data and the parameters;
    a condition specifying part for specifying, based on the at least one kind of extracted information associated with the data and the parameters by the extracted information applying part, either an arrangement condition in which at least one of the data and the parameters associated with each other are arranged, or a selection condition in which at least one of desired data and parameters are selected from at least one of the data and the parameters associated with each other; and
    a display part for either displaying at least one of the data and the parameters associated with each other in an arranged manner based on the arrangement condition, or displaying at least one of the desired data and parameters from the data and the parameters associated with each other in a selective manner based on the selection condition.

2. The data display device according to claim 1, further comprising an extracted information modifying part for producing modified extracted information obtained by weighting the at least one kind of extracted information associated with the data and the parameters by the extracted information applying part,
    wherein the condition specifying part is adapted to specify, based on the modified extracted information, either an arrangement condition in which at least one of the data and the parameters associated with each other are arranged, or a selection condition in which at least one of desired data and parameters are selected from at least one of the data and the parameters associated with each other.

* * * * *